United States Patent
Johnson et al.

(10) Patent No.: US 11,735,837 B2
(45) Date of Patent: Aug. 22, 2023

(54) ELECTRICAL GROUND STRAP ASSEMBLIES PROVIDING INCREASED POINT OF CONTACT BETWEEN A TERMINAL AND A BOLT

(71) Applicant: Production Spring, LLC, Troy, MI (US)

(72) Inventors: Lawrence Johnson, Troy, MI (US); Arturo Spaccarotelli, Saint Clair Shores, MI (US); Allan Anthony, Kimball, MI (US)

(73) Assignee: Production Spring, LLC, Troy, MI (US)

(*) Notice: Subject to any disclaimer, the term of this patent is extended or adjusted under 35 U.S.C. 154(b) by 0 days.

(21) Appl. No.: 17/218,288

(22) Filed: Mar. 31, 2021

(65) Prior Publication Data
US 2021/0226351 A1     Jul. 22, 2021

Related U.S. Application Data

(63) Continuation-in-part of application No. 16/656,010, filed on Oct. 17, 2019, now Pat. No. 10,998,648.

(51) Int. Cl.
*H01R 4/30*     (2006.01)
*H01R 4/34*     (2006.01)
*H01R 4/02*     (2006.01)

(52) U.S. Cl.
CPC ............ *H01R 4/304* (2013.01); *H01R 4/029* (2013.01); *H01R 4/34* (2013.01); *H01R 2201/26* (2013.01)

(58) Field of Classification Search
CPC .......... H01R 4/304; H01R 4/029; H01R 4/34; H01R 2201/26
USPC ......................................................... 439/388
See application file for complete search history.

(56) References Cited

U.S. PATENT DOCUMENTS

| | | | | |
|---|---|---|---|---|
| 1,384,019 | A * | 7/1921 | Johnston | F16B 39/36 411/270 |
| 3,535,678 | A | 10/1970 | Gulistan | |
| 5,388,941 | A | 2/1995 | Wuenscher | |
| 5,442,133 | A * | 8/1995 | Arnold | B23K 35/0288 439/92 |
| 5,487,685 | A * | 1/1996 | Stillback | H01R 4/304 439/883 |
| 6,056,490 | A * | 5/2000 | Dillemuth | F16B 39/023 411/325 |
| 6,077,096 | A * | 6/2000 | Moring | H01R 4/64 439/92 |
| 6,220,801 | B1 * | 4/2001 | Lin | F16B 31/02 411/533 |

(Continued)

FOREIGN PATENT DOCUMENTS

| | | | | |
|---|---|---|---|---|
| CN | 101850461 A | * | 10/2010 | |
| CN | 102362082 B | * | 5/2014 | ............ F16B 37/061 |

(Continued)

*Primary Examiner* — Peter G Leigh
(74) *Attorney, Agent, or Firm* — Dinsmore & Shohl LLP

(57) ABSTRACT

An electrical ground strap assembly for attaching a terminal, the electrical ground strap assembly including a bolt and a crown. The bolt includes a head, a body including an incline portion, and a shaft, the incline portion is oriented at an acute angle with respect to a planar surface of the head. The crown includes a chamfer, the chamfer oriented at an angle corresponding to the incline portion of the bolt.

21 Claims, 12 Drawing Sheets

(56) References Cited

U.S. PATENT DOCUMENTS

| | | | | |
|---|---|---|---|---|
| 6,746,285 B2 * | 6/2004 | Delcourt | | H01R 4/30 439/766 |
| 6,864,015 B2 * | 3/2005 | Peterson | | H01R 11/12 429/182 |
| 7,056,161 B2 * | 6/2006 | Delcourt | | H01R 4/30 411/181 |
| 7,156,670 B2 * | 1/2007 | Schaty | | H01R 13/03 439/92 |
| 7,788,802 B2 * | 9/2010 | Schaty | | H01R 4/64 29/512 |
| 7,892,049 B1 * | 2/2011 | Andler | | H01R 4/34 439/883 |
| 8,070,404 B1 | 12/2011 | Schluter | | |
| 8,141,229 B2 | 3/2012 | Babej et al. | | |
| 8,360,811 B2 | 1/2013 | Aoki | | |
| 8,845,254 B2 | 9/2014 | Lee | | |
| 9,175,715 B2 | 11/2015 | Babej | | |
| 9,520,657 B2 | 12/2016 | Lawson | | |
| 9,680,239 B2 * | 6/2017 | Boyer | | H01R 4/64 |
| 2002/0115317 A1 * | 8/2002 | Delcourt | | H01R 4/30 439/84 |
| 2003/0152439 A1 * | 8/2003 | Hartmann | | F16B 39/24 411/161 |
| 2004/0106309 A1 * | 6/2004 | Larsson | | H01R 4/66 439/92 |
| 2004/0253853 A1 * | 12/2004 | Delcourt | | H01R 11/12 439/92 |
| 2004/0259431 A1 * | 12/2004 | Delcourt | | H01R 11/12 439/766 |
| 2010/0074712 A1 | 3/2010 | Shinjo | | |
| 2015/0311601 A1 * | 10/2015 | Boyer | | H01R 4/64 439/92 |
| 2018/0266475 A1 | 9/2018 | Hoshino et al. | | |
| 2019/0270167 A1 * | 9/2019 | Brenninger | | B23K 35/0288 |
| 2019/0309787 A1 * | 10/2019 | Limatoc | | F16B 39/284 |

FOREIGN PATENT DOCUMENTS

| | | | | | |
|---|---|---|---|---|---|
| CN | 105508385 A | * | 4/2016 | | |
| CN | 206338301 U | * | 7/2017 | | |
| CN | 206338301 U | | 7/2017 | | |
| DE | 4307090 A1 | * | 10/1993 | | B21H 3/08 |
| DE | 29908831 U1 | | 7/1999 | | |
| DE | 202005003708 U1 | * | 6/2005 | | F16B 13/126 |
| DE | 102006012761 A1 | * | 9/2007 | | H01R 4/30 |
| DE | 102008021303 A1 | * | 10/2009 | | H01R 4/301 |
| EP | 2088645 B1 | * | 2/2012 | | H01R 4/26 |
| JP | 3104596 U | * | 9/2004 | | F16B 39/12 |
| JP | 2005127429 A | * | 5/2005 | | |
| JP | 2018040376 A | * | 3/2018 | | |

\* cited by examiner

ELECTRICAL GROUND STRAP ASSEMBLIES PROVIDING INCREASED POINT OF CONTACT BETWEEN A TERMINAL AND A BOLT

CROSS-REFERENCE TO RELATED APPLICATION

This application is a continuation-in-part application of co-pending U.S. patent application Ser. No. 16/656,010, filed Oct. 17, 2019, for "Electrical Ground Strap Assemblies Providing Increased Point of Contact Between a Terminal and a Bolt", which is hereby incorporated by reference in its entirety including the drawings.

TECHNICAL FIELD

The present disclosure pertains to a system for providing an electrical ground connection. More particularly, the present disclosure concerns a system for facilitating an electrical ground connection in an automotive vehicle. Even more particularly, the present disclosure relates to electrical ground connections utilizing a stud/nut combination assembly.

BACKGROUND

An electrical ground strap or ground wire in an automotive vehicle is a cable that connects the engine block to the chassis, or possible directly to the negative terminal of the battery. The ground strap completes the electrical circuit for numerous accessories, such as the ignition system, the alternator, or any number of sensors in the vehicle.

Electrical ground straps are ribbons of braided steel without any insulation. An electrode at the end of the ground strap is positioned around a bolt secured to the vehicle accessory or grounding component and locked in place by a nut. One common reason ground straps fail is because the individual strands of steel may snap over time due to the vibration and movement of the engine and other components of the vehicle. Alternatively, vehicle vibration may cause the contact between the electrode and the vehicle accessory or grounding component to become weaker or separate. Once a ground strap fails, whatever component is attached to that ground strap will become weaker. Some signs of defective ground straps include a dead battery, hard starting, cylinder misfire, loss of power, and the check engine light being active.

The prior art has addressed this situation by proposing a number of electrical grounding straps. For example, U.S. Pat. Nos. 5,442,133, 6,746,285, 7,056,161, and 7,892,049. However, these prior art references fail to teach any improvement in the connection between the electrode and the accessory or grounding component.

Thus, there exists a need in the art to provide an electrical ground strap that provides an improved connection between the strap and the component or accessory to which it is attached in order to reduce the likelihood of the strap failing. As in so many areas of automotive technology, there is always room for improvement related to electrical connection assemblies.

SUMMARY

An electrical ground strap assembly for attaching a terminal, the electrical ground strap assembly including a bolt including a head, a body including an incline portion, and a shaft, the incline portion is oriented at an acute angle with respect to a planar surface of the head, and a crown including a chamfer, the chamfer oriented at an angle corresponding to the incline portion of the bolt.

An electrical ground strap assembly for attaching a terminal, the electrical ground strap assembly including a terminal including an electrode and a strap, a bolt having a head, a body including an incline portion, and a shaft, the incline portion being oriented at an angle ranging from 30 to 60 degrees with respect to a planar surface of the head, and a crown having a chamfer, the chamfer being oriented at an angle corresponding to the incline portion of the bolt.

A method for securing an electrical terminal, the method comprising the steps of providing a bolt, the bolt having a head, a body including an incline portion, and a shaft, the incline portion being oriented at an angle ranging from 30 to 60 degrees with respect to a planar surface of the head, providing a terminal including an electrode and a strap, engaging the electrode onto the bolt, and engaging a crown onto the bolt and onto the electrode, the crown including a chamfer being oriented at an angle corresponding to the incline portion of the bolt, wherein the engaging of the crown onto the bolt and the electrode deforms the electrode to provide a mating fit between the incline portion of the bolt and the chamfer of the crown.

These and additional features provided by the embodiments described herein will be more fully understood in view of the following detailed description, in conjunction with the drawings.

BRIEF DESCRIPTION OF THE DRAWINGS

For a more complete understanding of the present disclosure, reference should now be made to the embodiments illustrated in greater detail in the accompanying drawings and described below by way of examples of the present disclosure wherein.

DETAILED DESCRIPTION

Figure 1:
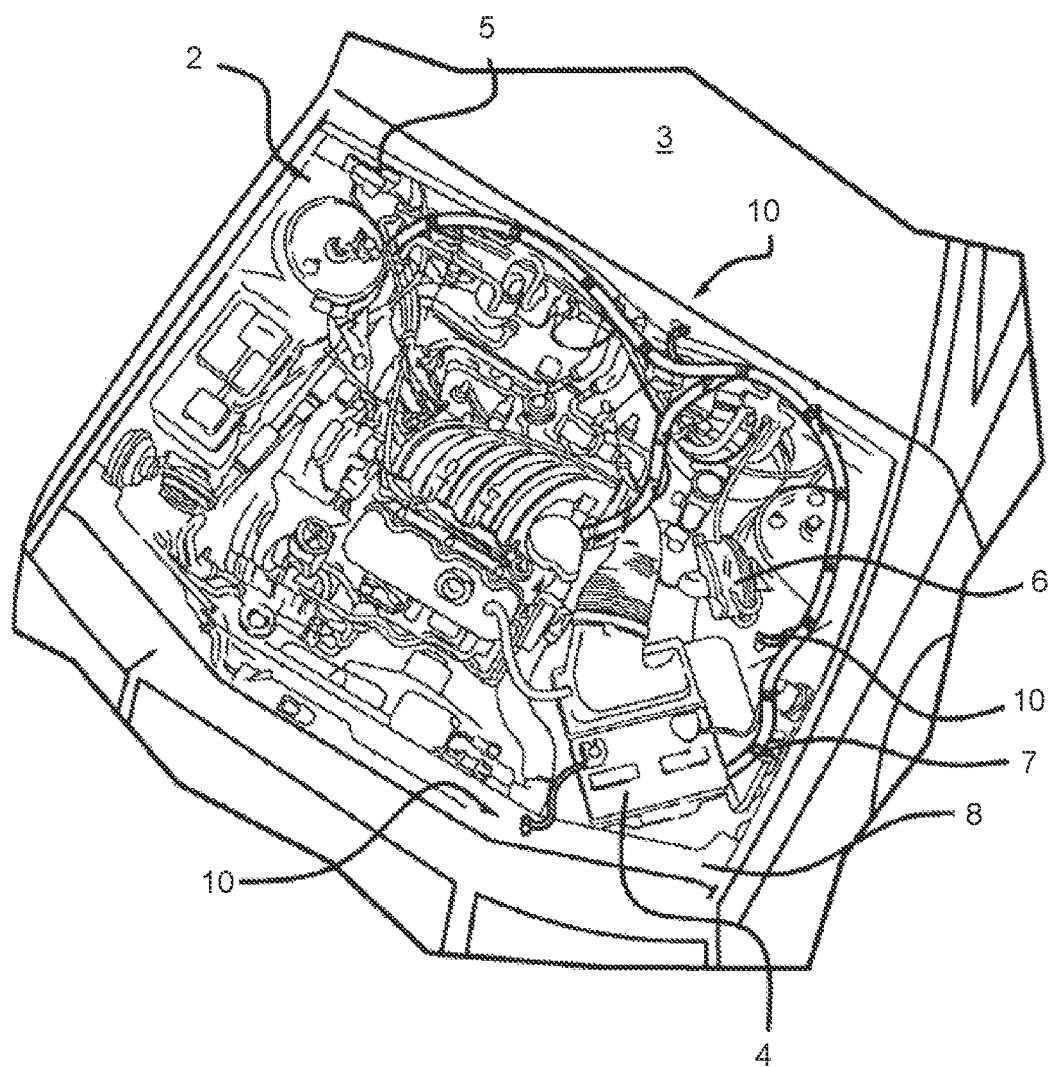
FIG. 1 schematically depicts a perspective view of an engine compartment of an automotive vehicle employing an embodiment of the present disclosure.

In the following figures, the same reference numerals will be used to refer to the same components. In the following description, various operating parameters and components are described for different constructed embodiments. These specific parameters and components are included as examples and are not meant to be limiting.

Referring to FIG. 1, embodiments described herein are directed to an electrical ground strap assembly 10, which may be employed in an engine compartment 2 of an automotive vehicle 3. The electrical ground strap assembly 10 is operable to conduct electricity from an electrical component, such as a battery 4, direct current window wiper motor 5, horn 6, power distribution box 7, or the like, to a conductive metal panel or frame 8 of the vehicle.

Figure 2:
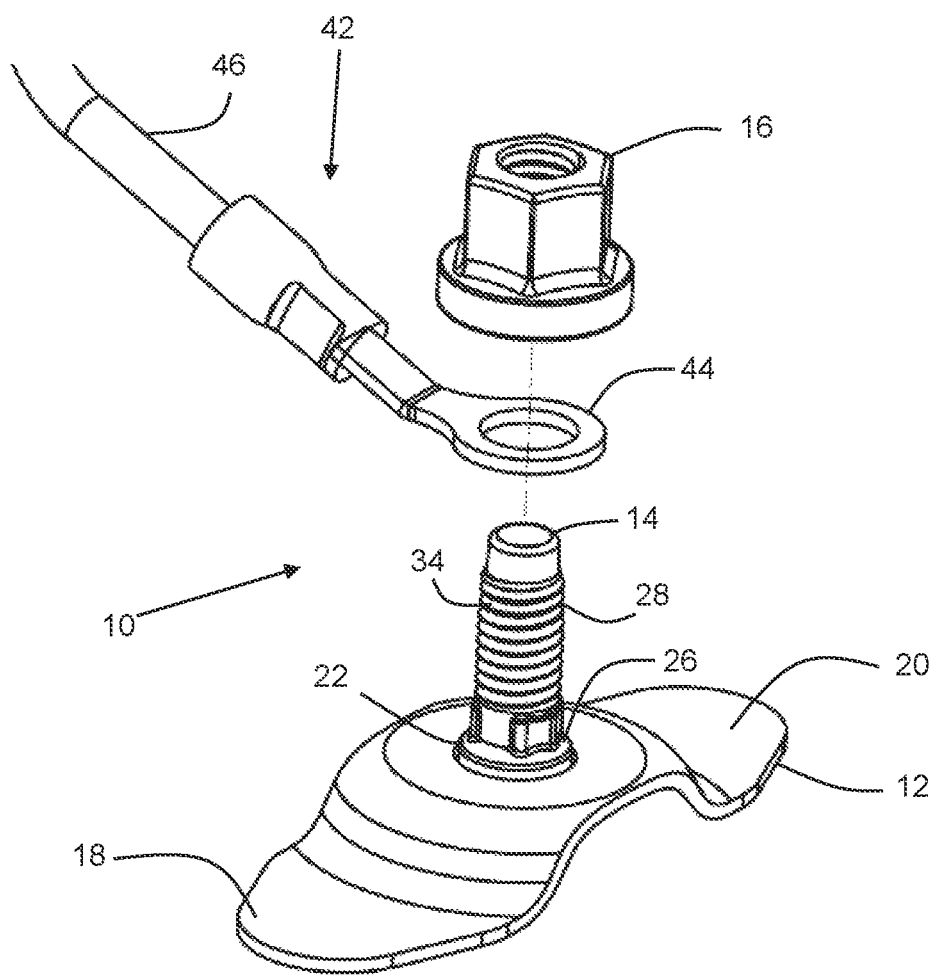
FIG. 2 schematically depicts a perspective exploded view of an electrical ground strap assembly in accordance with an embodiment of the present disclosure.

Referring now to FIG. 2, an embodiment of an electrical ground strap assembly 10 is illustrated according to one or more embodiments described herein. The electrical ground strap assembly 10 may include a carrier plate 12, a bolt 14, and a crown or nut 16. The carrier plate 12 may have any suitable geometry such as elongated or circular. As shown in FIG. 2, the carrier plate 12 has an elongated geometry. Regardless of its geometry, the carrier plate 12 includes at least two contact surfaces 18, 20 at which the carrier plate 12 is welded to a metal structure such as those found in an automobile requiring increased electrical grounding. The contact surfaces 18, 20 are coplanar with a top surface of the carrier plate 12. The carrier plate 12 also includes an opening 22 formed in a center thereof to allow the bolt 14 to extend through. Once the bolt 14 extends through the carrier plate 12, the two components may be welded together.

Figure 5:
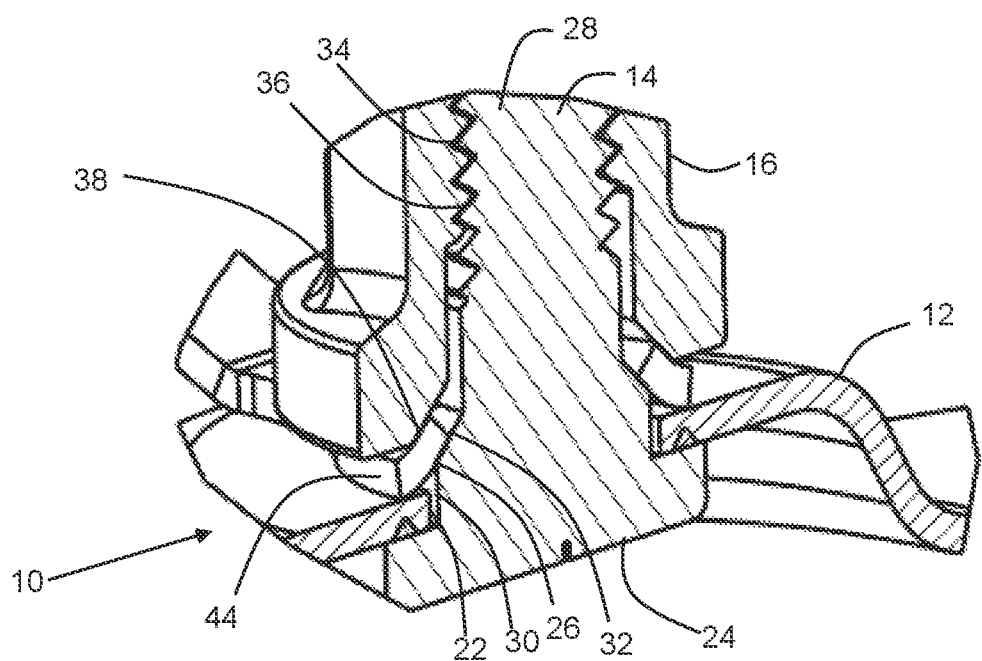
FIG. 5 schematically depicts a partial perspective view of the electrical ground strap assembly of FIG. 2 shown in cross-section taken along the line 5-5 of FIG. 4 in a tightened state.

As shown in FIG. 5, the bolt 14 includes a head 24, a body 26, and a shaft 28. The body 26 includes a vertical portion 30 extending perpendicular to the head 24 and an incline portion 32 extending inwardly, thereby interconnecting the body 26 and the shaft 28. In some embodiments, the incline portion 32 has a slope of between 30 degrees and 60 degrees. More particularly, the incline portion 32 has a slope of 45 degrees±5 degrees or ±10 degrees. The diameter of the head 24 of the bolt 14 is larger than the diameter of the opening 22 in the carrier plate 12 to prevent the bolt 14 from extending entirely through the carrier plate 12. The shaft 28 has a plurality of external threads 34 that engage the nut 16 as it is screwed onto the shaft 28.

Figure 3:
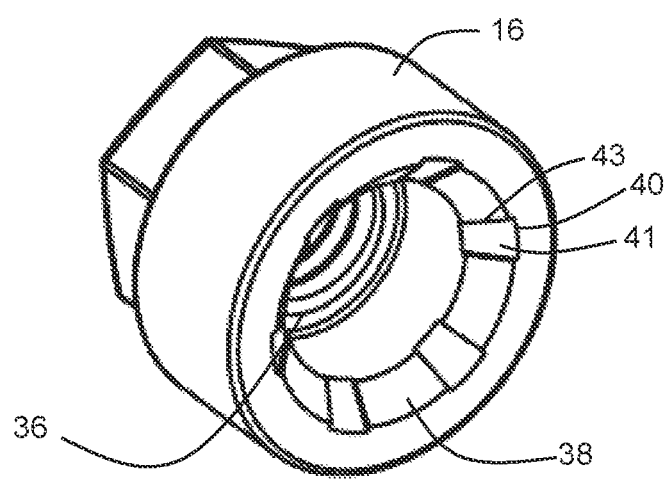
FIG. 3 schematically depicts a bottom perspective view of a nut in accordance with the present disclosure illustrated in FIG. 2.

As shown in FIG. 3, the nut 16 includes a plurality of internal threads 36 and a chamfer 38. Thus, the external threads 34 of the shaft 28 engage the internal threads 36 of the nut 16. At least one scraping feature 40 is formed on the chamfer 38 for purposes discussed in more detail below. In embodiments, a plurality of scraping features 40 is formed on the chamfer 38. Each scraping feature 40 includes a raised ledge 41 having a thickness defined by a scraping edge 43, which extends between the chamfer 38 and the raised ledge 41.

Figure 4:
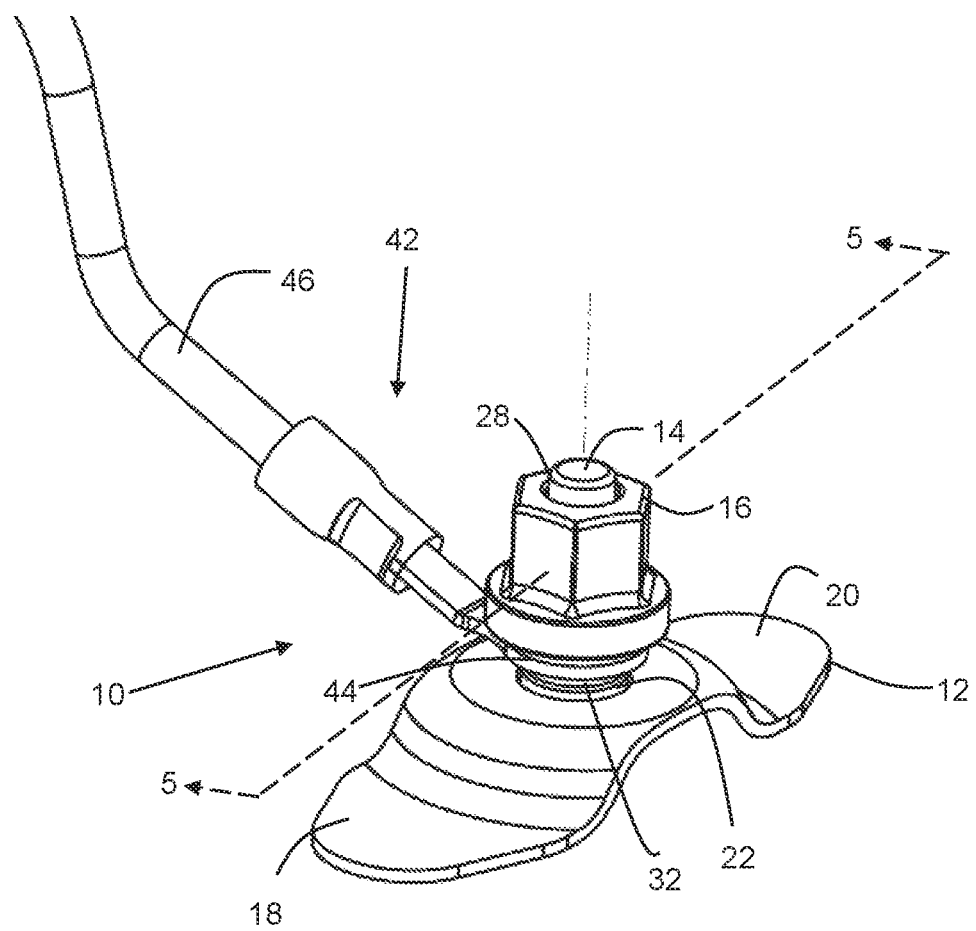
FIG. 4 schematically depicts a perspective view of the electrical ground strap assembly of FIG. 2 in a pre-tightened state.

Referring again to FIG. 2, a terminal 42 is shown including an electrode 44 and a strap 46. Prior to the nut 16 being lowered onto the bolt 14, the electrode 44 is situated around the shaft 28 and lowered onto the incline portion 32. As shown in FIG. 4, the electrode 44 is lowered onto the bolt 14 and the nut 16 is lowered onto the electrode 44. However, due to the diameter of the vertical portion 30 of the bolt 14 being greater than the diameter of the electrode 44, the electrode 44 does not sit flush on the top of the carrier plate 12. Thus, this illustrates the electrical ground strap assembly 10 in a pre-tightened state before the electrode 44 is deformed. It should be understood that all reference to any component being "lowered" onto another component should not be interpreted as being limiting to that occurring in a downward direction. It is understood that the present disclosure may be suitable in any arrangement and, thus, all reference to the nut 16 or terminal 42 being lowered onto the bolt 14 should be understood as the two components being "engaged."

Figure 6:
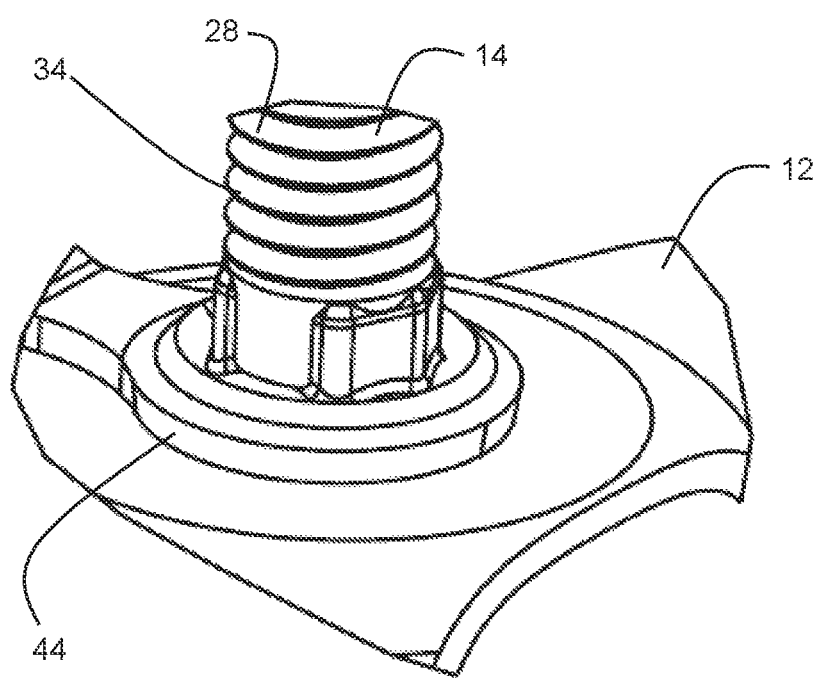
FIG. 6 schematically depicts a partial perspective view of the electrical ground strap assembly in the tightened state with the nut removed.

As shown in FIGS. 3 and 5, the chamfer 38 of the nut 16 has a slope corresponding to the incline portion 32 of the bolt 14. In some embodiments, the slope is about 45 degrees. Thus, as the nut 16 is screwed onto the bolt 14, force is exerted onto the electrode 44 of the terminal 42. Downward force from the nut 16 causes the electrode 44 to deform around the body 26 of the bolt 14, as shown in FIG. 6 without the nut 16 illustrated. Thus, this illustrates the electrical ground strap assembly 10 in its tightened state with the electrode 44 being deformed between the bolt 14 and the nut 16. It should be appreciated that deforming the electrode 44 to conform to the body 26 of the bolt 14 increases grounding between the carrier plate 12 and the terminal 42.

Figure 7:
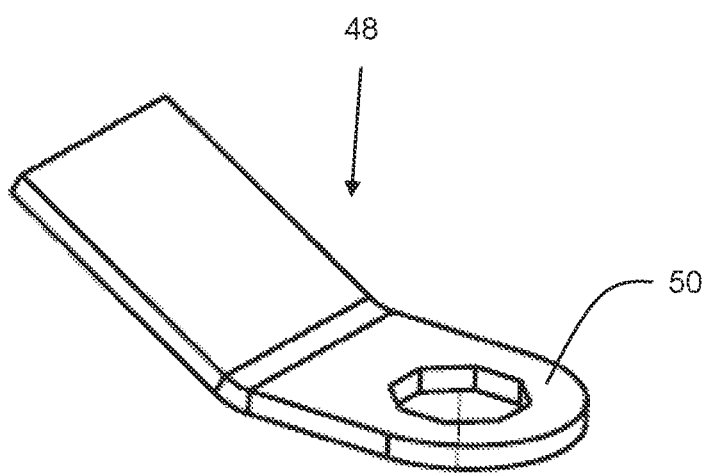
FIG. 7 schematically depicts a partial perspective view of an alternative embodiment of a terminal used in accordance with the present disclosure.
Figure 8:
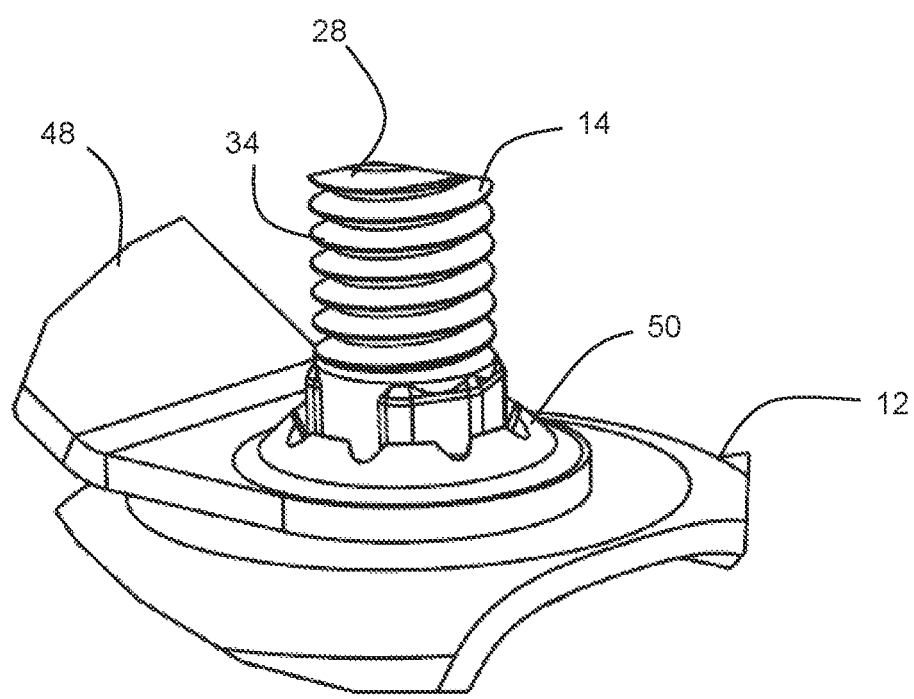
FIG. 8 schematically depicts a partial perspective view of the ground strap assembly of FIG. 2 in a tightened state utilizing the terminal of FIG. 7.

It should be noted that the electrode 44 of the terminal 42 is not limited to having a circular cross-section as illustrated in FIG. 2. As shown in FIGS. 7 and 8, an embodiment of a terminal 48 is shown having an electrode 50 with an octagonal cross-section corresponding to the cross-section of the shaft 28 of the bolt 14. When the cross-section of the electrode 50 corresponds to the cross-section of the shaft 28 of the bolt 14, the electrode 50 is prevented from rotating as the nut 16 comes into contact with the electrode 50. As such, any other geometry corresponding to the geometry of the bolt 14 may be useful in preventing rotation of the electrode 50 as the nut 16 is lowered on the bolt 14. The terminals 42, 48 may be used interchangeably based on the desires of the user and geometry of the electrical ground strap assembly 10.

Figure 9:
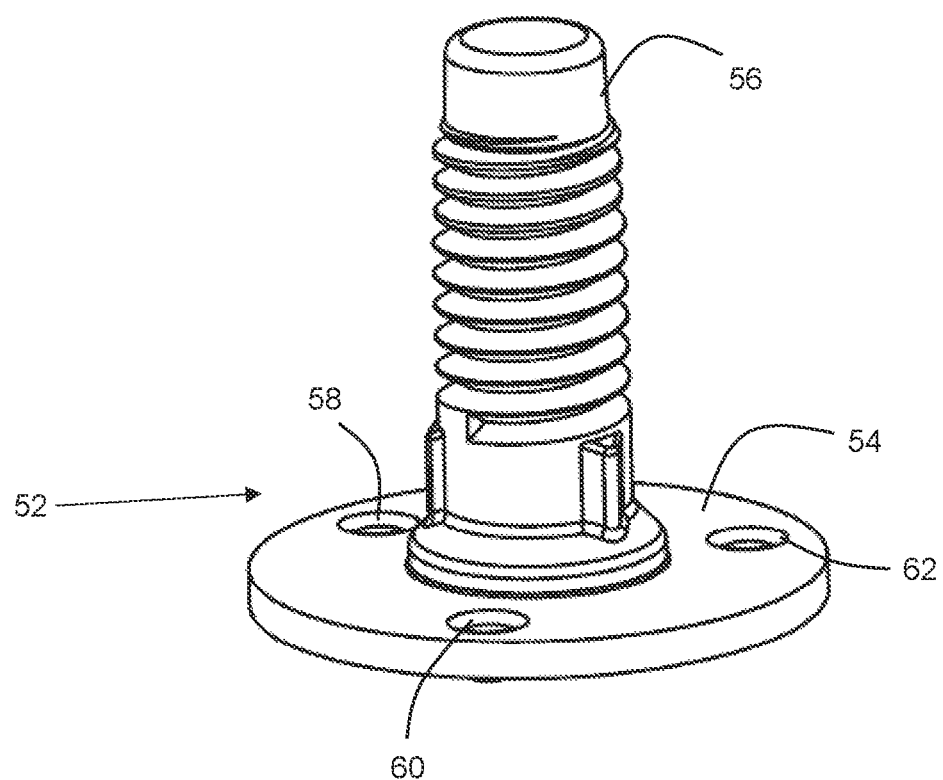
FIG. 9 schematically depicts a perspective view of an alternative embodiment of an electrical ground strap in accordance with the present disclosure.

It is to be understood that while there may be benefits of providing the carrier plate 12 and bolt 14 as separate components, the present disclosure may be provided as an initially integrally formed structure. It should be understood that the term "integrally formed" for purposes herein, should be interpreted as being a one-piece monolithic structure. Further, such a one-piece monolithic structure may be formed by being milled or cast from a single piece of material. For example, as shown in FIG. 9, an electrical ground strap assembly 52 is shown having a carrier plate 54 and a bolt 56 that are integrally formed. Thus, the carrier plate 54 is a radially-extending surface formed with and extending from the bolt 56. This configuration may be referred to as an arc stud as opposed to the carrier plate/bolt combination discussed herein. As a result, the electrical ground strap assembly 52 requires less material to be formed and takes up less surfaces area on the attached structure. In addition, the electrical ground strap assembly 52 includes three contact surfaces 58, 60, 62 that protrude from the carrier plate 54. In some embodiments, the contact surfaces 58, 60, 62 are disposed equidistantly around a circumference of the carrier plate 54. The contact surfaces 58, 60, 62 protrude from a bottom surface of the carrier plate 54 and assists in avoiding blowing or burning a hole through thin gauge materials.

Figure 10:
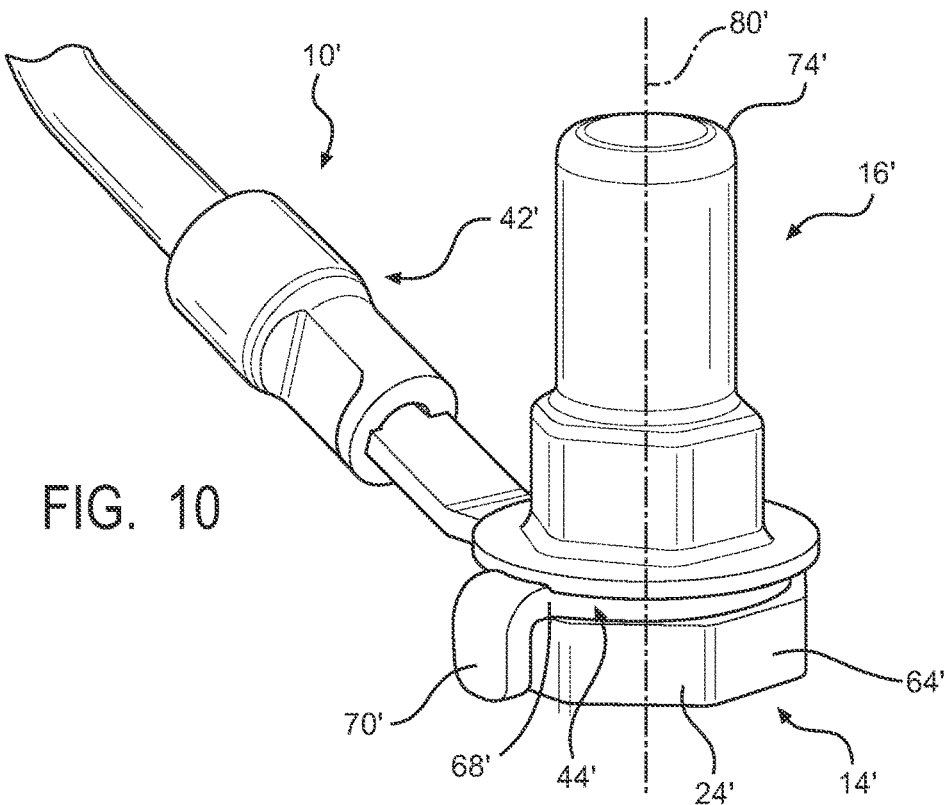
FIG. 10 is a perspective view of an alternative embodiment of the electrical ground strap in accordance with the present disclosure.
Figure 11:
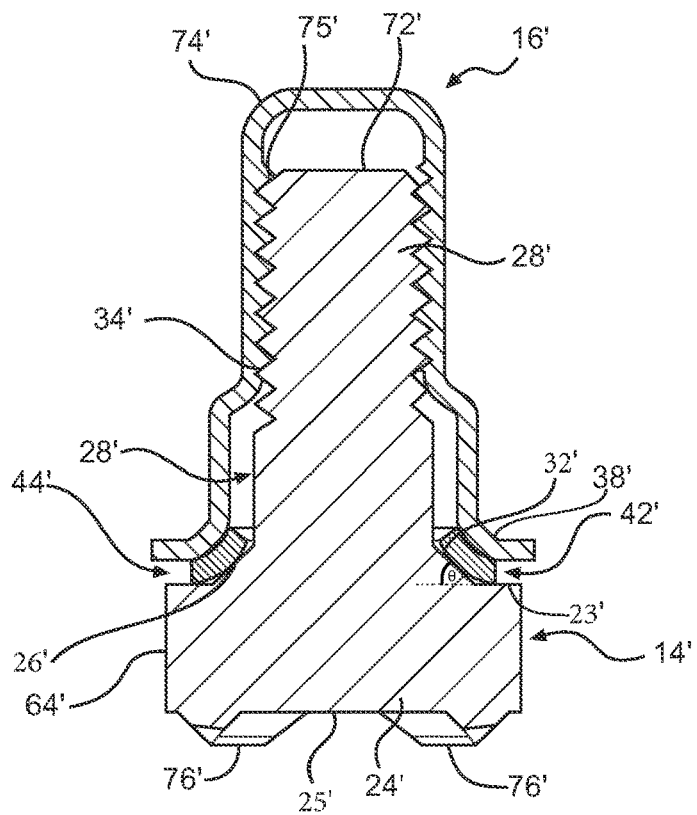
FIG. 11 is a cross-sectional view of an alternative embodiment of the electrical ground strap in accordance with the present disclosure.

Referring to FIGS. 10 and 11, an alternative embodiment of a ground strap assembly 10' is depicted. It should be appreciated that the disclosure of the ground strap assembly 10 may be equally applicable to like parts of the ground strap assembly 10' discussed herein. Accordingly, the ground strap assembly 10' includes a bolt 14' having a head 24' and a shaft 28' extending from the head 24', a terminal 42', and a crown 16'. For purposes discussed in more detail herein, the head 24' of the bolt 14' has an outer peripheral surface 64' having a polygonal geometry such as, for example, square, hexagonal, and the like. The terminal 42' includes an electrode 44' provided at an end thereof. As described herein with respect to the electrode 44, the electrode 44' is deformed to conform to the geometry of an incline portion 32' of a body 26' of the bolt 14', which extends from a planar surface extending parallel to an axis 80', described herein, and a chamfer 38' of the crown 16' (FIG. 11). More specifically, the electrode 44' is deformed between the chamfer 38' and the incline portion 32' once the electrode 44' is lowered onto the bolt 14' and the crown 16' is lowered onto the electrode 44' and tightened against the incline portion 32'. As such, it should be appreciated that the chamfer 38' of the crown 16' is oriented at an acute angle corresponding to the incline portion 32' of the bolt 14', as discussed herein with respect to the bolt 14 and the nut 16. As used herein, "corresponding" refers to the angles being the same or within a threshold, such as, in some embodiments, +/−1 degree, +/−5 degrees, or the like. As with the bolt 14, the incline portion 32' of the bolt 14' has a slope of between 30 degrees and 60 degrees, as shown by θ, with respect to an upper surface 23' of the head 24'. More particularly, the incline portion 32 has a slope of 45 degrees±5 degrees or ±10 degrees.

As shown in FIG. 10, the electrode 44' of the terminal 42' includes an anti-rotating feature 70' that extends from an outer radial edge 68' of the electrode 44' and extends parallel to an axis 80' defined by the shaft 28' of the bolt 14'. The anti-rotating feature 70' may be integrally formed with the electrode 44' as a one-piece, monolithic structure or may be separately formed and attached to the electrode 44'. When the electrode 44' is positioned on the shaft 28' and is rotated about the axis 80', the anti-rotating feature 70' contacts the peripheral surface 64' of the head 24' when the terminal 42' Thus, the anti-rotating feature 70' is configured to inhibit rotation of the terminal 42' around the head 24' of the bolt 14'.

Referring still to FIGS. 10 and 11, the crown 16' is illustrated extending over the shaft 28' of the bolt 14'. It should be appreciated that crown 16' is substantially similar to the nut 16 described herein. However, the crown 16' includes a cap 74' that extends over an end 72' of the shaft 28' opposite the head 24' when the crown 16' is positioned on the bolt 14'. Thus, the crown 16' conceals the shaft 28' during coating, as described in more detail herein.

As shown in FIG. 11, the crown 16', including the cap 74', may extend over the entire shaft 28' of the bolt 14'. As with the nut 16 described herein, the crown 16' includes internal threads 75' that correspond to external threads 34' of the bolt 14', such that the crown 16' threadedly engages the shaft 28'. The crown 16' includes the added benefit of sealing the shaft 28' of the bolt 14', which prevents fluid, such as from coating or painting of the ground strap assembly 10' or adjacent components, from seeping into an area between the crown 16' and the shaft 28'. The cap 74' provides a larger un-coated surface on the bolt 14' during an e-coating, painting, or other coating process, such as shown in the method 100 of FIG. 13 as opposed to the amount of coverage provided by the nut 16 on the shaft 28. Further, it should be appreciated that the crown 16' includes the scraping features 40 (FIG. 3) formed on the chamfer 38' of the crown 16', as discussed herein with respect to the nut 16.

Figure 12:
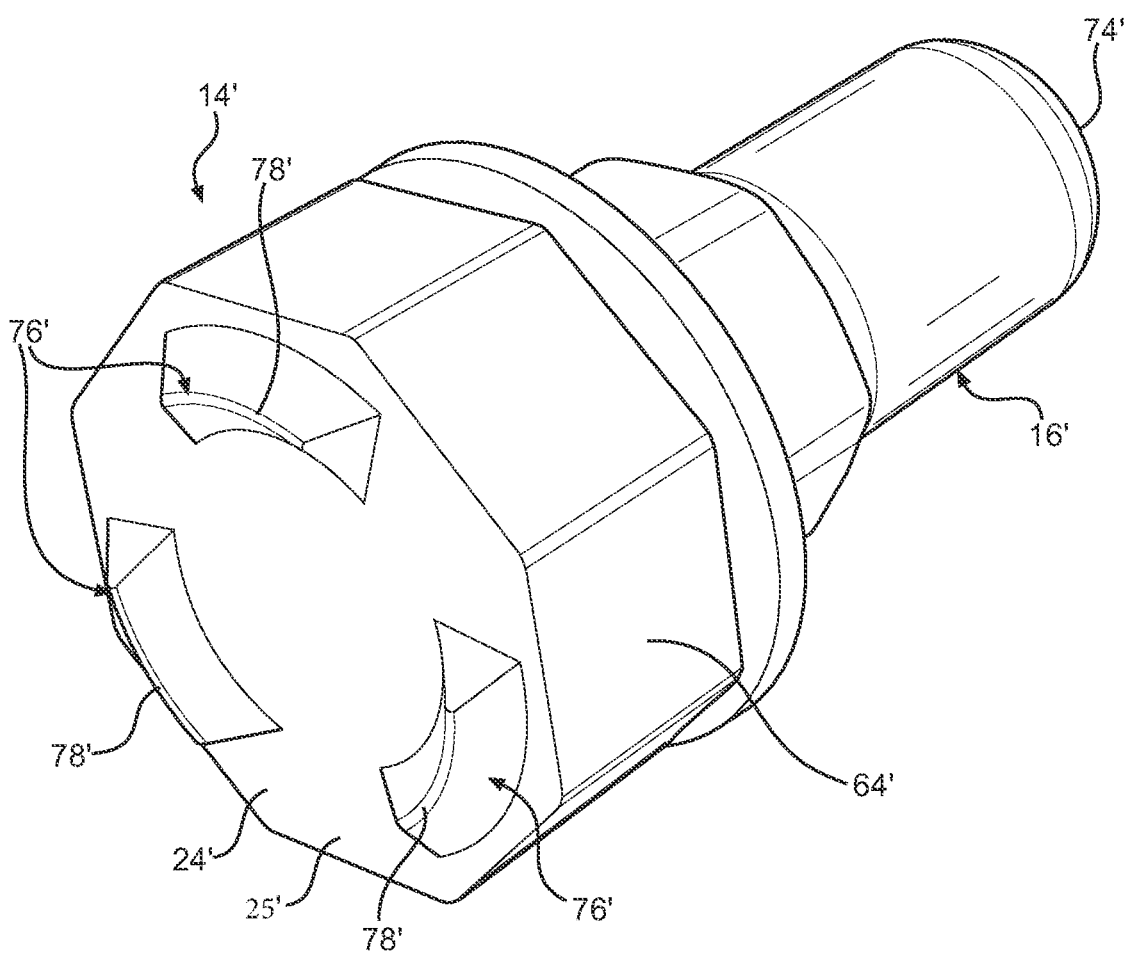
FIG. 12 is a perspective view of an alternative embodiment of the electrical ground strap in accordance with the present disclosure.

Referring to FIGS. 11 and 12, the bolt 14' may include welding projections 76' extending from a bottom surface 25' of the head 24' of the bolt 14' opposite the shaft 28'. The welding projections 76' are configured to permit welding of the bolt 14' to a metal structure without the use of a carrier plate, such as the carrier plate 12 of the electrical ground strap assembly 10.

As shown in FIG. 12, the welding projections 76' may include an arcuate shape, and be positioned annularly about the head 24'. In other words, the welding projections 76' may be equidistantly disposed around a circumference of the head 24' of the bolt 14'. The welding projections 76' may further include a tapered thickness, where a width of the welding projections 76' becomes gradually thinner as it extends in a direction opposite the head 24' of the bolt 14'. As shown in FIG. 12, the welding projections 76' are depicted as arcuate and generally triangular in shape. However, the welding projections 76' may include any shape, such as rectangular. Additionally, FIG. 12 depicts three welding projections 76' positioned on the surface 25' of the head 24'. However, there may be any number of welding projections 76', such as one, two, four, etc. In embodiments, the welding projections 76' may taper off to a ridge. As described herein with respect to the contact surfaces 58, the welding projections 76' define contact surfaces 78' at which the bolt 14' may be welded to a metal structure such as those found in an automobile requiring increased electrical grounding.

With respect to the ground strap assembly 10 illustrated in FIG. 2, prior to deforming the electrode 44 around the bolt 14, the entire electrical ground strap assembly 10 may be coated, such as e-coated, with paint or any other suitable coating material. However, doing so typically results in paint or residue remaining on the carrier plate 12 and the shaft 28 of the bolt 14, which results in poor decreased electrical grounding. Thus, the present disclosure also seeks to alleviate this problem by removing this paint and residue.

Figure 13:
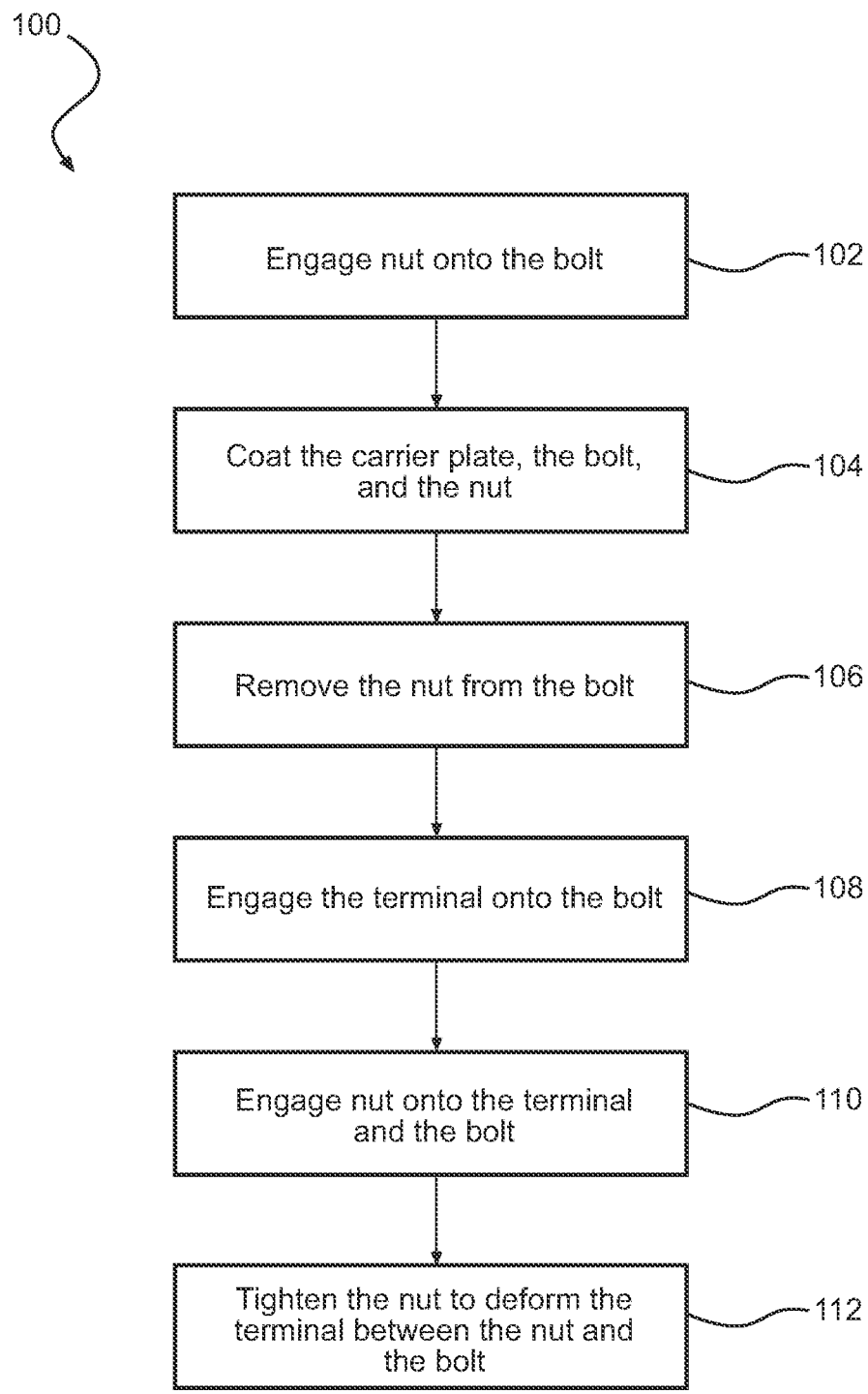
FIG. 13 depicts a flowchart illustrating another aspect of the present disclosure.

Accordingly, as illustrated in FIG. 13, a method 100 is disclosed for removing a coating from the shaft 28 of the bolt 14. However, it should be appreciated that the method 100 disclosed herein is equally applicable to coating the ground strap assembly 10'. Specifically, the nut 16 is engaged onto the bolt 14 prior to coating (Step 102). Once the electrical ground strap assembly 10 is coated (Step 104), the nut 16 is removed (Step 106), which results in a clean, un-coated surface on the carrier plate 12. In addition, as the nut 16 is removed from the bolt 14, the scraping feature 40 on the nut 16 removes paint and residue on the body 26 and the shaft 28 of the bolt 14. By removing paint and residue from the body 26 of the bolt 14, the electrical contact between the electrode 44 of the terminal 42 and the bolt 14 is improved. Thereafter, the electrode 44 may be positioned on the carrier plate 12 (Step 108) and the nut 16 screwed back onto the bolt 14 (Step 110) as discussed above. The scraping feature 40 also provides the additional benefit of scraping the top surface of the electrode 44 as it is lowered, thereby scrapes film or porosity from oxidation of aluminum as the electrode 44 is deformed (Step 112).

From the above, it is to be appreciated that defined herein is a new and unique electrical ground strap assembly for use in vehicles to provide increased electrical grounding.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electrical ground strap assembly for attaching a terminal, the electrical ground strap assembly comprising:
    a bolt including a head, a body including an incline portion, and a shaft, the incline portion is oriented at an acute angle with respect to a planar surface of the head; and
    a crown including a chamfer, the chamfer oriented at an angle corresponding to the incline portion of the bolt.

2. The electrical ground strap assembly of claim 1, further comprising at least one welding projection extending from the head of the bolt in a direction opposite the body.

3. The electrical ground strap assembly of claim 2, wherein:
    the bolt includes a plurality of welding projections equidistantly disposed around a circumference of the head of the bolt.

4. The electrical ground strap assembly of claim 1, wherein the crown includes a cap that extends over an end of the shaft of the bolt.

5. The electrical ground strap assembly of claim 1, wherein the interior of the crown includes a plurality of scraping features, each one of the scraping features including a raised ledge and a scraping edge which defines a thickness between the raised ledge and the chamfer of the crown.

6. The electrical ground strap assembly of claim 1, wherein the crown and the bolt cooperate to deform the terminal when secured therebetween.

7. The electrical ground strap assembly of claim 1, wherein a diameter of an opening formed in the terminal is less than an outer diameter of the incline portion.

8. An electrical ground strap assembly for attaching a terminal, the electrical ground strap assembly comprising:
    a terminal including an electrode and a strap;
    a bolt having a head, a body including an incline portion, and a shaft, the incline portion being oriented at an angle ranging from 30 to 60 degrees with respect to a planar surface of the head; and
    a crown having a chamfer, the chamfer being oriented at an angle corresponding to the incline portion of the bolt.

9. The electrical ground strap assembly of claim 8, wherein the electrode includes an anti-rotating feature configured to inhibit rotation of the electrode about the bolt.

10. The electrical ground strap assembly of claim 8, further comprising:
    at least one welding projection extending from the head of the bolt in a direction opposite the body.

11. The electrical ground strap assembly of claim 8, wherein the crown includes a cap that extends over an end of the shaft of the bolt.

12. The electrical ground strap assembly of claim 8, wherein the interior of the crown includes a plurality of scraping features, each one of the scraping features including a raised ledge and a scraping edge which defines a thickness between the raised ledge and the chamfer of the crown.

13. The electrical ground strap assembly of claim 8, wherein the crown and the bolt cooperate to deform the electrode of the terminal when secured therebetween.

14. A method for securing an electrical terminal, the method comprising the steps of:
    providing a bolt, the bolt having a head, a body including an incline portion, and a shaft, the incline portion being oriented at an angle ranging from 30 to 60 degrees with respect to a planar surface of the head;
    providing a terminal including an electrode and a strap;
    engaging the electrode onto the bolt; and
    engaging a crown onto the bolt and onto the electrode, the crown including a chamfer being oriented at an angle corresponding to the incline portion of the bolt,
    wherein the engaging of the crown onto the bolt and the electrode deforms the electrode to provide a mating fit between the incline portion of the bolt and the chamfer of the crown.

15. The method of claim 14, wherein the interior of the crown includes a plurality of scraping features, each one of the scraping features including a raised ledge and a scraping edge which defines a thickness between the raised ledge and the chamfer of the crown.

16. The method of claim 15, further comprising the steps of:
    prior to engaging the electrode onto the bolt, engaging the crown onto the bolt;
    subsequently, coating the bolt and the crown; and
    after coating the bolt and the crown, removing the crown to provide a un-coated surface on the bolt.

17. The method of claim 16, wherein:
    the shaft of the bolt includes external threads;
    the crown includes a cap that extends over an end of the shaft when the crown is engaged onto the bolt; and
    the un-coated surface on the bolt includes the external threads.

18. The method of claim 14, wherein the crown and the bolt cooperate to deform the electrode of the terminal when secured therebetween.

19. The method of claim 14, wherein the electrode includes an anti-rotating feature configured to inhibit rotation of the electrode about the bolt.

20. The method of claim 14, wherein the bolt includes at least one welding projection extending from the head of the bolt.

21. The method of claim 20, further comprising the step of:
    welding the bolt directly to a plate via the at least one welding projection.

* * * * *